United States Patent

Hirasa et al.

[11] Patent Number: 5,859,092
[45] Date of Patent: Jan. 12, 1999

[54] RECORDING LIQUID

[75] Inventors: Takashi Hirasa; Hiroshi Takimoto; Yukichi Murata; Hiroshi Mikami; Shoji Toki, all of Kanagawa, Japan

[73] Assignee: Mitsubishi Chemical Corporation, Tokyo, Japan

[21] Appl. No.: 840,451

[22] Filed: Apr. 18, 1997

[51] Int. Cl.$^6$ ...................................................... C09D 11/10
[52] U.S. Cl. ........................... 523/161; 524/495; 524/496; 524/837; 260/DIG. 38; 106/31.6; 106/31.65; 106/31.13
[58] Field of Search .................... 523/161; 260/DIG. 38; 106/31.6, 31.65, 31.13; 524/495, 496, 832

[56] References Cited

U.S. PATENT DOCUMENTS

| | | | |
|---|---|---|---|
| 4,471,100 | 9/1984 | Tsubakimoto et al. | 525/367 |
| 5,157,069 | 10/1992 | Campbell | 524/500 |
| 5,166,245 | 11/1992 | Zuraw | 524/270 |

FOREIGN PATENT DOCUMENTS

| | | |
|---|---|---|
| 0 333 499 | 9/1989 | European Pat. Off. . |
| 2-149331 | 6/1970 | Japan . |
| 56-89827 | 7/1981 | Japan . |
| 56-89828 | 7/1981 | Japan . |
| 62-42731 | 2/1987 | Japan . |
| 4-13783 | 1/1992 | Japan . |
| 7-185291 | 7/1995 | Japan . |
| 8-10602 | 1/1996 | Japan . |
| 8-60063 | 3/1996 | Japan . |

*Primary Examiner*—Marion McCamish
*Assistant Examiner*—John J. Guarriello
*Attorney, Agent, or Firm*—Oblon, Spivak, McClelland, Maier & Neustadt, P.C.

[57] ABSTRACT

A recording liquid containing an aqueous medium, a pigment and a polymer, wherein the polymer comprises at least one polymer containing a repeating unit A having at least one of a carboxyl group and an acid anhydride group and an allylether unit B of the formula (I),

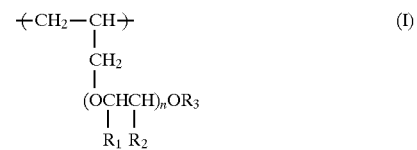

wherein $R_1$ and $R_2$ are a hydrogen atom or a substituted or unsubstituted $C_1$–$C_5$ alkyl group, $R_3$ is a hydrogen atom, an alkyl group, an alkylcarbonyl group, an alkenyl group, an alkenylcarbonyl group, an aryl group, an arylcarbonyl group, an aralkyl group, an aralkylcarbonyl group, a cycloalkyl group, a cycloalkylcarbonyl group, a heterocyclic group or a carbonyl group having a heterocyclic group, and these groups other than a hydrogen atom may have a substituent, and n is from 1 to 50.

16 Claims, No Drawings

RECORDING LIQUID

BACKGROUND OF THE INVENTION

1. Field of the Invention

The present invention relates to an aqueous recording liquid, particularly a recording liquid for writing or ink jet printing.

2. Discussion of Background

Heretofore, a water-color ink containing an acid dye or a direct dye dissolved in an aqueous medium, or a solvent-type ink containing an oil-soluble dye dissolved in an organic solvent, has been used as a recording liquid for ink jet printing. The solvent type ink has a problem of environmental safety and it is not suitable for use in offices.

On the other hand, the water-color ink containing a water-soluble dye, has a problem that the record will be poor in water resistance, when recording is made on a pulp paper. The record with the ink also has a poor light resistance. The same problems are also found in the recording liquid for writing.

To solve such problems, it has been proposed to use an aqueous dispersion ink employing a pigment such as carbon black with excellent water resistance and light resistance as a coloring material. However, the aqueous dispersion ink of a conventional pigment has problems such that the dispersion stability is poor, that a nozzle is easily clogged during recording, thus making a stable recording difficult, and that its recording density of the record is low.

SUMMARY OF THE INVENTION

It is an object of the present invention to provide an aqueous dispersion ink employing an aqueous pigment, which gives a record with excellent water resistance on a a pulp paper by writing or ink jet recording, high recording density, high jetting stability, high reliability, high printing quality, and excellent fastnesses including excellent light resistance in addition to the excellent water resistance. It is another object of the present invention to provide an aqueous pigment dispersion ink of which a stability of storing for a long period of time is excellent.

Thus, the present invention provides a recording liquid containing an aqueous medium, a pigment and a polymer, wherein the polymer comprises at least one polymer containing a repeating unit A having at least one of a carboxyl group and an acid anhydride group and an allylether unit B of the formula (I),

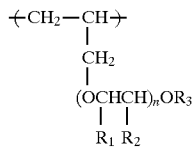
(I)

wherein $R_1$ and $R_2$ are a hydrogen atom or a substituted or unsubstituted $C_1$–$C_5$ alkyl group, $R_3$ is a hydrogen atom, an alkyl group, an alkylcarbonyl group, an alkenyl group, an alkenylcarbonyl group, an aryl group, an arylcarbonyl group, an aralkyl group, an aralkylcarbonyl group, a cycloalkyl group, a cycloalkylcarbonyl group, a heterocyclic group or a carbonyl group having a heterocyclic group, and these groups other than a hydrogen atom may have a substituent, and n is from 1 to 50.

DETAILED DESCRIPTION OF THE INVENTION

Now, the present invention will be described in detail with reference to the preferred embodiments.

The present inventors have made various studies concerning dispersibility of a pigment in a recording liquid, and as test results of various dispersants, it has been found that a polymer having a repeating unit A containing at least one carboxyl group and an allylether unit B of the above formula (I) achieves an excellent effect as a dispersant. The present invention has been made on the basis of this finding. A recording liquid of such a composition provides a satisfactory jetting stability during recording, and also provides a recorded matter having a high density, a satisfactory printing quality and a high fastness including a high light-resistance in addition to a high water-resistance. Further, the recording liquid has a satisfactory stability and does not cause settlement of a pigment during storing for a long term.

From a viewpoint of stability of a recording liquid, it is preferable that the polymer used in the recording liquid of the present invention has the repeating unit A containing at least one of a carboxyl group and an acid anhydride group in the range of from 10 to 70 mol % and the allylether unit B of the formula (I) in the range of from 5 to 70 mol %. Further, it is preferable that the recording liquid has additionally an a-olefin unit C of the formula (II) in addition to the repeating unit A and the allylether unit B.

In such a case, a preferable content ratio (mol %) of repeating unit A/allylether unit B/a-olefin unit C is in the range of 10–70/5–70/5–50, preferably in the range of 20–70/5–50/5–50.

Examples of the repeating unit A include a repeating unit derived from an unsaturated carboxylic acid such as acrylic acid, methacrylic acid, crotonic acid, itaconic acid, maleic acid or fumaric acid, and a repeating unit derived from a monoester of an unsaturated dicarboxylic acid such as itaconic acid monoester, maleic acid monoester or fumaric acid monoester. These carboxyl groups may be in the form of a free acid, but preferably in the form of a salt such as an alkali metal salt of lithium, sodium or potassium, an ammonium salt, or an ammonium salt substituted with an alkyl group, a hydroxyalkyl group or a carboxylalkyl group. In the case of these salts, they may be used in a mixture of two or more, if necessary. As a unit containing at least one acid anhydride group, a repeating unit derived from maleic anhydride or itaconic anhydride is preferable.

In the allylether unit B of the above formula (I) and the α-olefin unit C of the formula (II), $R_1$ and $R_2$ are a hydrogen atom and a substituted or unsubstituted $C_1$–$C_5$ alkyl group (such as a $C_1$–$C_5$ linear or branched alkyl group including a methyl group or an ethyl group, and an alkyl group substituted with an alkoxy group, a phenoxy group, a carboxyl group, a sulfonyloxy group or a halogen atom, including an isopropoxymethyl group, a phenoxymethyl group, a 4-methoxyphenoxymethyl group, a butylcarboxymethyl group, a sulfonyloxymethyl group, a chloromethyl group or the like), but $R_1$ and $R_2$ are preferably a hydrogen atom or an unsubstituted alkyl group in the present invention. $R_3$, $R_4$ and $R_5$ are a hydrogen atom, a substituted or unsubstituted alkyl group (such as a $C_1$–$C_{50}$, preferably $C_1$–$C_{18}$ linear or branched alkyl group, including a methyl group, an ethyl group, an isopropyl group, a n-butyl group, a n-octyl group, a 2-ethylhexyl group and the like, and an alkyl group substituted with a hydroxyl group, a carboxyl group, a carboxycyclohexyl group, a mercapto group or a carbamoyl group, including a hydroxyethyl group, a carboxypropyl group, a carboxycyclohexylmethyl group, 1-carboxy-2-mercaptoethyl group, 1-carboxy-2-carbamoylethyl group, 1-isopropyl-1-carboxymethyl group, 1,2-dicarboxypropyl group and the like), a substituted or unsubstituted alkenyl group (such as a linear or branched $C_2$–$C_{50}$ alkenyl group including a 2-methyl-1-propenyl group, a vinyl group, an allyl group and the like, which may be substituted with a carboxyl group, a halogen atom or a hydroxyl group), a substituted or unsubstituted aryl group (such as a phenyl group, and a phenyl group substituted with a carboxyl group or an alkyl group, including a 3,4-dicarboxyphenyl group, a 4-butylphenyl group, a 4-carboxyphenyl group and the like), a substituted or unsubstituted aralkyl group (such as a phenylalkyl group having a $C_7$–$C_{30}$ aralkyl structure part, including a benzyl group, a phenylethyl group and the like, and a phenylalkyl group substituted with a carboxyl group or a hydroxyl group, including a 1-carboxy-2-phenylethyl group, a 1-carboxy-2-hydroxy-phenylethyl group, a 4-carboxybenzyl group, and the like), a substituted or unsubstituted cycloalkyl group (such as a cyclohexyl group or a cycloalkyl group substituted with a carboxyl group or a hydroxyl group, including a 4-carboxycyclohexyl group and the like), or a substituted or unsubstituted heterocyclic group (such as a heterocyclic group having a 5- or 6-membered ring containing 1 or 2 nitrogen atoms, sulfur atoms or the like, or their condensed ring, or a condensed ring of these rings with a benzene ring, which may be substituted with an alkyl group, a carboxyl group or the like). Further, $R_3$ represents a carbonyl group having the above-mentioned alkyl group, alkenyl group, aryl group, aralkyl group, cycloalkyl group or heterocyclic group as a substituent. Particularly, $R_3$ is preferably a hydrogen atom or a substituted or unsubstituted alkyl group in the present invention.

Further, $R_4$ and $R_5$ are preferably a hydrogen atom, a substituted or unsubstituted alkyl group or a substituted or unsubstituted aryl group in the present invention. If necessary, the polymer used in the present invention may further contain a unit other than the above-mentioned three components of the repeating unit A, the allylether unit B of the formula (I) and the a-olefin unit C of the formula (II).

Further, n is generally in the range of from 1 to 50, but when n is in the range of from 3 to 30, the shelf-stability of the recording liquid becomes more satisfactory.

The weight average molecular weight of the polymer is generally from 500 to 50,000, preferably from 1,000 to 20,000.

Particular examples of the polymer include the following copolymers No. 1 to No. 13, and they may be used alone or in combination depending on its use.

|  | mol % |
|---|---|
| −(CH₂−CH)−<br>  \|<br>  CH₂<br>  \|<br>  (OCH₂CH₂)₁₀O−C₆H₅ | 25 |
| −(CH₂−CH)− C₂H₅<br>  \|          \|<br>  CH₂CH₂CHCH₃ | 20 |

Copolymer No. (6)
(weight average molecular weight: 3,200)

|  | mol % |
|---|---|
| −(CH−CH)−<br>  \|    \|<br>  O=C   C=O<br>  \|    \|<br>  H₃NO  ONH₃<br>  \|    \|<br>  C₂H₅  C₂H₅ | 70 |
| −(CH₂−CH)−<br>  \|<br>  CH₂<br>  \|<br>  (OCH₂CH₂)₁₅OCH₂CH=CH₂ | 20 |
| CH₃<br>  \|<br>  −(CH₂−CH)−<br>         \|<br>         C₆H₅ | 10 |

Copolymer No. (7)
(weight average molecular weight: 12,800)

|  | mol % |
|---|---|
| −(CH−CH)−<br>  \|    \|<br>  O=C   C=O<br>  \|    \|<br>  ONa   ONa | 35 |
| −(CH₂−CH)−<br>  \|<br>  CH₂<br>  \|<br>  (OCH₂CH₂)₅₀OH | 30 |
| −(CH₂−CH)−<br>  \|<br>  C₂H₄ | 35 |

Copolymer No. (8)
(weight average molecular weight: 9,000)

|  | mol % |
|---|---|
| COONa<br>  \|<br>  −(CH₂−C)−<br>  \|<br>  CH₂−COONa | 30 |
| −(CH₂−CH)−<br>  \|<br>  CH₂<br>  \|<br>  (OCH₂CH₂)₂₀OCH₂COONa | 30 |
| −(CH₂−CH)−<br>  \|<br>  C₆H₁₃(n) | 40 |

Copolymer No. (9)
(weight average molecular weight: 5,500)

|  | mol % |
|---|---|
| −(CH−CH)−<br>  \|    \|<br>  O=C   C=O<br>  \|    \|<br>  H₃NO  ONH₃<br>  \|    \|<br>  C₂H₄OH C₂H₄OH | 60 |
| −(CH₂−CH)−<br>  \|<br>  CH₂<br>  \|<br>  (OCH₂CH₂)₁₀−pyridyl | 20 |
| −(CH₂−CH)−<br>  \|<br>  C₈H₁₇(n) | 10 |
| −(CH₂−CH)−<br>  \|<br>  C₄H₉(n) | 10 |

Copolymer No. (10)
(weight average molecular weight)

|  | mol % |
|---|---|
| −(CH−CH)−<br>  \|    \|<br>  O=C   C=O<br>  \|    \|<br>  NaO   ONa | 59 |
| −(CH₂−CH)−<br>  \|<br>  CH₂<br>  \|<br>  (OCH₂CH₂)₁₆OCH₃ | 39 |
| −(CH₂−CH)−<br>         \|<br>         C₆H₅ | 2 |

Copolymer No. (11)
(weight average molecular weight: 3,000)

|  | mol % |
|---|---|
| −(CH−CH)−<br>  \|    \|<br>  O=C   C=O<br>  \|    \|<br>  OK    OK | 50 |
| −(CH₂−CH)−<br>  \|<br>  CH₂<br>  \|<br>  (OCH₂CH₂)₅OCH₃ | 30 |
| −(CH₂−CH)−<br>  \|<br>  R | 20 |

Copolymer No. (12)
(weight average molecular weight: 4,000)

|  | mol % |
|---|---|
| −(CH−CH)−<br>  \|    \|<br>  O=C   C=O<br>  \|    \|<br>  (HOH₅C₂)NO ON(C₂H₅OH)₃<br>  \|    \|<br>  H     H | 63 |
| −(CH₂−CH)−<br>  \|<br>  R | 22 |

-continued

| | mol % |
|---|---|
| $-(CH_2-CH)-$<br>         |<br>         R' | 15 |

Copolymer No. (11)
(weight average molecular weight: 3,000)

| | mol % |
|---|---|
| $-(CH-\!\!\!-\!\!\!-CH)-$<br> |        |<br> C=O  C=O<br> |        |<br> OK    OK | 50 |
| $-(CH_2-CH)-$<br>         |<br>         $CH_2$<br>         |<br>         $(OCH_2CH_2)_5OCH_3$ | 20 |
| $-(CH_2-CH)-$<br>         |<br>         R" | 30 |

(R: a mixture of $C_{30}$–$C_{60}$ groups having an average carbon number of 46)
(R': a mixture of $C_{30}$–$C_{60}$ groups having an average carbon number of 46)
(R": a mixture of $C_{20}$–$C_{28}$ groups having an average carbon number of 22)

A polymer used in the present invention can be prepared by a well-known method. For example, the above polymer No. (1) can be prepared in the following manner. 0.08 mol % of a commercially available α-olefin (tradename: Dialene 30 manufactured by Mitsubishi Chemical Corporation, average carbon number 48, weight average molecular weight: 670), 0.12 mol % of polyethylene glycol allylmethyl ether (average molecular weight: 300), 0.20 mol of maleic anhydride and 100 g of xylene were charged in a flask. After the content of the reactor was fully substituted with $N_2$ gas, 3.0 g of ditertiary butyl peroxide (DTBPO) was added to the reaction mixture dividedly in an amount of ⅙ by ⅙ at 1 hour intervals under stirring at 140° C. After the addition, the reaction was conducted for 2 hours at the same temperature.

After finishing the reaction, xylene was distilled off at an elevated temperature, and an unreacted α-olefin and maleic anhydride were removed under a reduced pressure. To the resultant reaction mixture, was added an NaOH aqueous solution under stirring at an elevated temperature to hydrolyze maleic anhydride, and the resultant mixture was then filtrated by No. 5C filter paper and then by a hydrophilized teflon filter having a retaining particle size of 5 μm, to obtain an aimed polymer aqueous solution (pH 10.5).

A pigment used in the recording liquid of the present invention is preferably carbon black.

As carbon black for the recording liquid of the present invention, commercially available products may be used. Preferred is carbon black having a primary particle size of from 10 to 100 nm, a DBP oil absorption of from 40 to 250 ml/100 g and a pH of from 3 to 9. Particularly preferred is the one having a primary particle size of from 10 to 30 nm and a DBP oil absorption of from 50 to 200 ml/100 g. Specifically, products manufactured by Mitsubishi Chemical Corporation and represented by tradenames #30, #33, #40, #42, #45, #48, #52, #95, #2600, MA7, MA8, MA11, MA100, MA230 and MA600 may, for example, be mentioned. Further examples of carbon black include Color Black FW1, 2, 18, 200, Special Black 4, 4A, 5, 6, S160, 170, Printex A, G, L6, L, P, U, V, 140U, 140V, 25, 30, 35, 40, 45, 60, 75, 80, 85, 90, 95, 200 and 300 of Degussa Co., Raven 410, 420, 430, 450, 460, 500, 520, 760ULTRA, 780ULTRA, 790ULTRA, 850, 890 and 1020 of Columbian Co., and Regal 250R, 330R, 415R, 995R, Monarch 120, 280, 460, 800, 880 and 900 of Cabot Co.

Physical properties of typical examples of these carbon black are illustrated in the following Table 1.

TABLE 1

| | Primary particle size (nm) | Specific surface area (m²/g) | DBP oil absorption (ml/100 g) | pH |
|---|---|---|---|---|
| MA230 | 30 | 70 | 113 | 3.0 |
| #45 | 24 | 125 | 53 | 8.0 |
| MA100 | 22 | 134 | 100 | 3.5 |
| MA8 | 24 | 137 | 58 | 3.0 |
| MA600 | 18 | 150 | 130 | 7.5 |
| #2600 | 13 | 360 | 80 | 6.5 |
| FW18 | 15 | 260 | 160 | 4.0 |
| MA77 | 24 | 137 | 65 | 3.0 |

Examples of pigments other than carbon black include commercially available products as mentioned in Color Index such as Pigment Yellow 1, 2, 3, 12, 13, 14, 16, 17, 73, 74, 75, 83, 93, 95, 97, 98, 109, 114, 116, 128, 129, 151, 154, Pigment Red, 5, 7, 12, 48(Ca), 48(Mn), 57(Ca), 57:1, 112, 122, 123, 168, 177, 184, 194, 202, 209, 224, Pigment Orange 43, Pigment Violet 3, 19, 23, 37, Pigment Blue 1, 2, 3, 15:3, 15:6, 15:34, 16, 22, 60, 209, Pigment Black and the like. Further examples include phthalocyanine type, azo type, anthraquinone type, azomethine type and condensed ring type pigments. Still further examples include organic pigments such as Yellow No. 4, No. 5, No. 205 and No. 401, Orange No. 204, Red No. 104, No. 201, No. 202, No. 204, No. 220, No. 226-No. 228 and No. 405, and Blue No. 1 and No. 404, and inorganic pigments such as titanium oxide, zinc oxide, zirconium oxide, iron oxide, ultramarine, Prussian blue and chromium oxide. These pigments including carbon black may be used in a mixture of two or more.

The aqueous medium to be used for the recording liquid of the present invention is composed mainly of water, but it is preferred to incorporate a water-soluble organic solvent to water. The water-soluble organic solvent may, for example, be glycols such as ethylene glycol, propylene glycol, butylene glycol, diethylene glycol, triethylene glycol, polyethylene glycol (#200, #300 or #400) and glycerol, alkyl ethers of such glycols, N-methylpyrrolidone, 1,3-dimethylimidazolidone, thiodiglycol, 2-pyrrolidone, sulforane, dimethylsulfoxide, alkanolamines such as diethanolamine and triethanolamine, and lower alcohols such as ethanol and isopropanol. These solvents may be used in a mixture of two or more. Among these solvents, N-methylpyrrolidone or 2-prrolidone is particularly preferable in respect to jetting properties.

To the recording liquid of the present invention, a surface tension-controlling agent, a water-soluble resin, a fungicide, a bactericide, a pH-controlling agent, urea or the like, may be incorporated, as the case requires, in addition to the above described components.

To prepare the recording liquid of the present invention, firstly the above described respective components are mixed, and a pigment is pulverized into fine particles and dispersed by means of a dispersing apparatus. As the dispersing apparatus, a ball mill, a roll mill, a sand grind mill or a jet mill where solids can be milled in the absence of any media, such as Nanomizer (tradename, produced by Nanomizer Co.) and Ultimizer (tradename, produced by Dow Technology Co.), may, for example, be employed. Particularly preferred is a sand grind mill or a jet mill. After the grinding and dispersing treatment, coarse particles will be removed by means of a filtration apparatus or a centrifugal separator. The particle size of pigment (coagulated particle) is preferably adjusted to 1 μm or less. Components other than the pigment, the dispersing agent and water, may be added after the grinding and dispersing treatment. The grinding and dispersing treatment can efficiently be carried out when the pigment concentration is high. Accordingly, it is preferred to prepare a dispersion liquid in a concentration higher than the predetermined concentration of pigment finally in the recording liquid and to dilute it with an aqueous medium to finally adjust the pigment concentration appropriate in the recording liquid.

The pigment is used generally in the range of from 1 to 10 wt %, preferably from 3 to 8 wt %, to the recording liquid. The polymer is used generally in the range of from 5 to 100 wt %, preferably from 20 to 80 wt %, to the pigment. The water-soluble organic solvent in the recording liquid is used generally in the range of from 5 to 30 wt %, preferably from 10 to 20 wt %.

Now, the present invention will be described in further detail with reference to Examples. However, it should be understood that the present invention is by no means restricted to such specific Examples. Further, in the following description, "parts" means "parts by weight", unless otherwise specified.

EXAMPLE 1

Preparation of recording liquid

| Composition of recording liquid | Amount (parts) |
| --- | --- |
| Glycerol | 16 |
| Ethylene glycol | 18 |
| Carbon black MA100 | 11 |
| Polymer No. (2) | 3 |
| Deionized water | 52 |
| Total | 100 |

The above-identified components were taken into a stainless steel container and subjected to pulverization treatment for 60 hours by means of a sand grinder together with 152 parts of glass beads having an average diameter of 0.5 mm. The obtained liquid was diluted with 127 parts of deionized water and stirred. Then, it was filtrated under pressure by means of No. 5C filter paper. The liquid thereby obtained was used as a recording liquid.

Printing test

Using the above obtained recording liquid, ink jet recording was carried out on an electrophotographic paper (Xerox 4024 paper, tradename, manufactured by Xerox Corporation) by means of an ink jet printer (Desk Jet 1200C (300 dpi) or Desk Writer 660C (600 dpi), tradenames, manufactured by Hewlett Packard Co.).

The results were evaluated under the following standards, and shown in the following Table 2.

Evaluation standards of jetting stability:
○: No substantial printing omissions and stable jetting performance observed.
Δ: Slight printing omissions observed, but practically no problem.
X: Substantial printing omissions observed.

Evaluation standards of printing quality:
○: No substantial blur observed.
Δ: Slight blur observed, but practically no problem.
X: Substantial blur observed.

Evaluation of printing record density

The density of the printed product obtained by the above printing test was measured by means of a Macbeth reflection densitometer (RD914). The results of evaluation are shown in Table 2.

Water resistance test

The printed product obtained in the printing test, was immersed in city water in a beaker for 5 seconds. The printed product was dried, and the presence or absence of print smudging was visually evaluated. The results were evaluated under the following standards and shown in Table 2.

Evaluation standards:
○: No substantial print smudging observed.
Δ: Slight print smudging observed, but practically no problem.
x: Substantial print smudging observed.

Light resistance test

The printed product was irradiated for 100 hours by means of a xenon fade meter (manufactured by Suga Shikenki K.K.), whereupon discoloration was visually evaluated. The results were evaluated under the following standards and shown in Table 2.

Evaluation standards:
○: Good
Δ: Slight discoloration observed, but practically no problem
x: Substantial discoloration observed Storage stability test of the recording liquid The recording liquid was sealed in a Teflon container and stored at 60° C. for one month, whereupon the presence or absence of gelation or precipitation was visually evaluated. The results were evaluated under the following standards and shown in Table 2.

Evaluation standards:
○: No substantial gelation or precipitation observed.
Δ: Slight gelation or precipitation observed, but practically no problem.
x: Substantial gelation or precipitation observed.

EXAMPLE 2

Preparation of recording liquid

| Composition of recording liquid | Amount (parts) |
| --- | --- |
| Glycerol | 16 |
| Ethylene glycol | 18 |
| Carbon black MA8 | 11 |
| Polymer No. (10) | 3 |
| Deionized water | 52 |
| Total | 100 |

The above components were taken into a stainless steel container and subjected to pulverization treatment for 60 hours by means of a sand grinder together with 152 parts of glass beads having an average diameter of 0.5 mm. The obtained liquid was diluted with 127 parts of deionized water and stirred. Then, it was filtrated under pressure by means of No. 5C filter paper. The liquid thereby obtained was used as a recording liquid.

With respect to this recording liquid, the printing test, the water-resistance test, the light-resistance test and the storage stability test, and their evaluations were carried out in the same manner as in Example 1. The evaluation results are shown in Table 2.

EXAMPLE 3

Preparation of recording liquid

| Composition of recording liquid | Amount (parts) |
| --- | --- |
| Glycerol | 16 |
| Ethylene glycol | 18 |
| Carbon black MA230 | 11 |
| Polymer No. (1) | 3 |
| Deionized water | 52 |
| Total | 100 |

The above components were taken into a stainless steel container and subjected to pulverization treatment for 60 hours by means of a sand grinder together with 152 parts of glass beads having an average diameter of 0.5 mm. The obtained liquid was diluted with 127 parts of deionized water and stirred. Then, it was filtrated under pressure by means of No. 5C filter paper.

With respect to this recording liquid, the printing test, the water resistance test, the light resistance test and the storage stability test, and their evaluations were carried out in the same manner as in Example 1. The evaluation results are shown in Table 2.

EXAMPLE 4

Preparation of recording liquid

| Composition of dispersion | Amount (parts) |
| --- | --- |
| Glycerol | 16 |
| Ethylene glycol | 18 |
| Carbon black #45 | 13 |
| Polymer No. (3) | 3 |
| Deionized water | 50 |
| Total | 100 |

The above components were taken into a stainless steel container and subjected to pulverization treatment for 60 hours by means of a sand grinder together with 152 parts of glass beads having an average diameter of 0.5 mm. The obtained liquid was diluted with 127 parts of deionized water and stirred. Then, it was filtrated under pressure by means of No. 5C filter paper. The liquid thereby obtained was used as a recording liquid.

With respect to this recording liquid, the printing test, the water resistance test, the light resistance test and the storage stability test, and their evaluations were carried out in the same manner as in Example 1. The evaluation results are shown in Table 2.

EXAMPLE 5

Preparation of recording liquid

| Composition of recording liquid | Amount (parts) |
| --- | --- |
| Glycerol | 16 |
| Ethylene glycol | 18 |
| Carbon black MA230 | 11 |
| Polymer No. (2) | 3 |
| Deionized water | 52 |
| Total | 100 |

The above components were taken into a stainless steel container and subjected to pulverization treatment for 60 hours by means of a sand grinder together with 152 parts of glass beads having an average diameter of 0.5 mm. The obtained liquid was diluted with 127 parts of deionized water and stirred. Then, it was filtrated under pressure by means of No. 5C filter paper. The liquid thereby obtained was used as a recording liquid.

With respect to this recording liquid, the printing test, the water resistance test, the light resistance test and the storage stability test, and their evaluations were carried out in the same manner as in Example 1. The results are shown in Table 2.

EXAMPLE 6

Preparation of recording liquid

| Composition of recording liquid | Amount (parts) |
| --- | --- |
| Glycerol | 16 |
| Ethylene glycol | 18 |
| Carbon black MA600 | 11 |
| Polymer No. (7) | 3 |
| Deionized water | 52 |
| Total | 100 |

The above components were taken into a stainless steel container and subjected to pulverization treatment for 60 hours by means of a sand grinder together with 152 parts of glass beads having an average diameter of 0.5 mm. The obtained liquid was diluted with 127 parts of deionized water and stirred. Then, it was filtrated under pressure by means of No. 5C filter paper. The liquid thereby obtained was used as a recording liquid.

With respect to this recording liquid, the printing test, the water resistance test, the light resistance test and the storage stability test, and their evaluations were carried out in the same manner as in Example 1. The results are shown in Table 2.

EXAMPLES 7 to 16

The following components of each Example were taken into a stainless steel container and subjected to pulverization treatment for 60 hours by means of a sand grinder together with 152 parts of glass beads having an average diameter of 0.5 mm. The obtained liquid was diluted with 127 parts of deionized water and stirred. Then, it was filtrated under pressure by means of No. 5C filter paper. The liquid thereby obtained was used as a recording liquid.

With respect to this recording liquid, the printing test, the water resistance test, the light resistance test and the storage stability test, and their evaluations were carried out in the same manner as in Example 1. The results are shown in Table 2.

EXAMPLE 7

Preparation of recording liquid

| Composition of recording liquid | Amount (parts) |
| --- | --- |
| N-methylpyrrolidone | 16 |
| Glycerol | 16 |
| Carbon black FW18 | 11 |
| K salt of polymer No. (1) | 8 |
| Deionized water | 49 |
| Total | 100 |

EXAMPLE 8

Preparation of recording liquid

| Composition of recording liquid | Amount (parts) |
|---|---|
| N-methylpyrrolidone | 16 |
| Polyethylene glycol | 16 |
| Carbon black FW18 | 11 |
| Triethanol amine salt of polymer No. (1) | 8 |
| Deionized water | 49 |
| Total | 100 |

EXAMPLE 9

Preparation of recording liquid

| Composition of recording liquid | Amount (parts) |
|---|---|
| 2-Pyrrolidone | 11 |
| N-methylpyrrolidone | 4 |
| Polyethylene glycol #300 | 11 |
| Carbon black FW18 | 11 |
| K salt of polymer No. (1) | 8 |
| Deionized water | 55 |
| Total | 100 |

EXAMPLE 10

Preparation of recording liquid

| Composition of recording liquid | Amount (parts) |
|---|---|
| Triethanol amine | 16 |
| Polyethylene glycol #300 | 16 |
| Carbon black FW18 | 11 |
| K salt of polymer No. (1) | 8 |
| Deionized water | 49 |
| Total | 100 |

EXAMPLE 11

Preparation of recording liquid

| Composition of recording liquid | Amount (parts) |
|---|---|
| Glycerol | 16 |
| Ethylene glycol | 18 |
| Carbon black MA77 | 14 |
| Polymer No. (11) | 4 |
| Urea | 7 |
| Deionized water | 41 |
| Total | 100 |

EXAMPLE 12

Preparation of recording liquid

| Composition of recording liquid | Amount (parts) |
|---|---|
| Glycerol | 16 |
| Ethylene glycol | 18 |
| Polyethylene glycol #300 | 7 |
| Carbon black MA100 | 14 |
| Polymer No. (13) | 4 |
| Deionized water | 41 |
| Total | 100 |

EXAMPLE 13

Preparation of recording liquid

| Composition of recording liquid | Amount (parts) |
|---|---|
| Polyethylene glycol #300 | 16 |
| Ethylene glycol | 18 |
| Carbon black #2600 | 14 |
| Polymer No. (12) | 4 |
| Ethanol | 7 |
| Deionized water | 41 |
| Total | 100 |

EXAMPLE 14

Preparation of recording liquid

| Composition of recording liquid | Amount (parts) |
|---|---|
| Glycerol | 16 |
| Ethylene glycol | 16 |
| Red No. 220 | 9 |
| Polymer No. (11) | 6 |
| Deionized water | 53 |
| Total | 100 |

EXAMPLE 15

Preparation of recording liquid

| Composition of recording liquid | Amount (parts) |
|---|---|
| Glycerol | 16 |
| Ethylene glycol | 16 |
| CINQUASIA RED B*1 | 9 |
| Polymer No. (11) | 6 |
| Deionized water | 53 |
| Total | 100 |

EXAMPLE 16

Preparation of recording liquid

| Composition od recording liquid | Amount (parts) |
|---|---|
| Glycerol | 16 |
| Ethylene glycol | 16 |
| Irugazine Yellow 2GLTE *2 | 9 |
| Polymer No. (11) | 6 |
| Deionized water | 53 |
| Total | 100 |

*1Product of Ciba Geigy Co. (C.I. Pigment Violet 19)
*2Product of Ciba Geigy Co. (C.I. Pigment Yellow 109)

TABLE 2

| | Printing density | 5 second-water-resistance test | Storage stability | Light-resistance test | Jetting stability HP Desk Jet 1200C | Jetting stability HP Desk Writer 660C | Printing quality |
|---|---|---|---|---|---|---|---|
| Example 1 | 1.28 | ◯ | ◯ | ◯ | ◯ | — | ◯ |
| Example 2 | 1.25 | ◯ | ◯ | ◯ | ◯ | — | ◯ |
| Example 3 | 1.42 | ◯ | ◯ | ◯ | ◯ | — | ◯ |
| Example 4 | 1.31 | ◯ | ◯ | ◯ | ◯ | — | ◯ |
| Example 5 | 1.35 | ◯ | ◯ | ◯ | ◯ | — | ◯ |
| Example 6 | 1.30 | ◯ | ◯ | ◯ | ◯ | — | ◯ |
| Example 7 | 1.30 | ◯ | ◯ | ◯ | ◯ | ◯ | ◯ |
| Example 8 | 1.31 | ◯ | ◯ | ◯ | ◯ | ◯ | ◯ |
| Example 9 | 1.32 | ◯ | ◯ | ◯ | ◯ | ◯ | ◯ |
| Example 10 | 1.30 | ◯ | ◯ | ◯ | ◯ | Δ | ◯ |
| Example 11 | 1.31 | ◯ | ◯ | ◯ | ◯ | Δ | ◯ |
| Example 12 | 1.29 | ◯ | ◯ | ◯ | ◯ | — | ◯ |
| Example 13 | 1.25 | ◯ | ◯ | ◯ | ◯ | — | ◯ |
| Example 14 | 1.10 | ◯ | ◯ | ◯ | ◯ | — | ◯ |
| Example 15 | 1.12 | ◯ | ◯ | ◯ | ◯ | — | ◯ |
| Example 16 | 1.13 | ◯ | ◯ | ◯ | ◯ | — | ◯ |

By using the recording liquid of the present invention for ink jet printing, a highly reliable recording having a satisfactory jetting performance can be made, and when recorded on a pulp paper, a recorded matter having a high water-resistance, a high recording density, a satisfactory printing quality and a satisfactory fastness including a high light-resistance, can be obtained. Particularly when carbon black is used as a pigment, a satisfactory black recorded matter can be obtained. Since the recording liquid of the present invention has the above-mentioned properties, it can be used not only for writing or ink jet printing but also for other uses.

What is claimed is:

1. A recording liquid containing an aqueous medium, a pigment and a polymer, wherein the polymer comprises at least one polymer containing a repeating unit A having at least one of a carboxyl group or an acid anhydride group, an allylether unit B of the formula (I) and an α-olefin unit C of the formula (II),

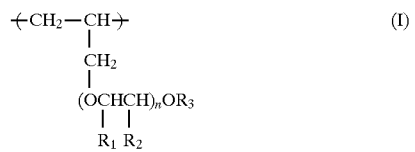

wherein $R_1$ and $R_2$ are a hydrogen atom or a substituted or unsubstituted $C_1$–$C_5$ alkyl group, $R_3$ is a hydrogen atom, an alkyl group, an alkylcarbonyl group, an alkenyl group, an alkenylcarbonyl group, an aryl group, an arylcarbonyl group, an aralkyl group, an aralkylcarbonyl group, a cycloalkyl group, a cycloalkylcarbonyl group, a heterocyclic group or a carbonyl group having a heterocyclic group, and these groups other than a hydrogen atom may have a substituent, and n is from 1 to 50,

wherein $R_1$ and $R_5$ are a hydrogen atom, an alkyl group, an alkenyl group, an aryl group, an aralkyl group, a cycloalkyl group or a heterocyclic group, and these groups other than a hydrogen atom may have a substituent.

2. The recording liquid according to claim 1, wherein the pigment is selected from the group consisting of Pigment Yellow, Pigment Red, Pigment Violet, Pigment Blue, Pigment Black, and other phthalocyanine pigments, azo pigments, anthraquinon pigments, azomethine pigments, condensed ring pigments, carbon black and inorganic pigments.

3. The recording liquid according to claim 1, wherein the polymer contains from 10 to 70 mol % of the repeating unit A and from 5 to 70 mol % of the allylether unit B of the above formula (I).

4. The recording liquid according to claim 1, wherein the polymer contains from 10 to 70 mol % of the repeating unit A, from 5 to 70 mol % of the allylether unit of the above formula (I) and from 5 to 50 mol % of an α-olefin unit C of the formula (II).

5. The recording liquid according to claim 1, wherein the repeating unit A is a unit derived from at least one member selected from the group consisting of
   (a) an unsaturated monocarboxylic acid and its salt,
   (b) an unsaturated dicarboxylic acid, its salt and its monoester, and
   (c) an unsaturated dicarboxylic acid anhydride.

6. The recording liquid according to claim 1, wherein the repeating unit A is a unit derived from at least one member selected from the group consisting of acrylic acid, methacrylic acid, crotonic acid, and their salts, itaconic acid, maleic acid, fumaric acid, their salts and their esters, and maleic anhydride and itaconic anhydride.

7. The recording liquid according to claim 1, wherein in the formula (I), $R_1$ and $R_2$ are respectively a hydrogen atom or an unsubstituted $C_1$–$C_5$ alkyl group, and $R_3$ is a hydrogen atom or a substituted or unsubstituted alkyl group.

8. The recording liquid according to claim 4, wherein in the formula (II), $R_4$ and $R_5$ are respectively a hydrogen atom, a substituted or unsubstituted alkyl group or a substituted or unsubstituted aryl group.

9. The recording liquid according to claim 1, wherein the pigment is carbon black.

10. The recording liquid according to claim 1, wherein the aqueous medium contains N-methylpyrrolidone or 2-pyrrolidone.

11. The recording liquid according to claim 1, wherein n in the formula (I) is from 3 to 30.

12. The recording liquid according to claim 1, wherein the polymer has a weight average molecular weight of from 500 to 50,000.

13. The recording liquid according to claim 9, wherein the carbon black has a primary particle size of from 10 to 100 nm and a DBP oil absorption of from 40 to 250 ml/100 g.

14. The recording liquid according to claim 1, wherein the pigment is contained in an amount of from 1 to 10 wt % to the recording liquid.

15. The recording liquid according to claim 1, wherein the polymer is contained in an amount of from 5 to 100 wt % to the pigment.

16. The recording liquid according to claim 1, wherein the aqueous medium contains a water-soluble organic solvent in an amount of from 5 to 30 wt % to the recording liquid.

* * * * *

UNITED STATES PATENT AND TRADEMARK OFFICE
CERTIFICATE OF CORRECTION

PATENT NO. : 5,859,092
DATED : January 12, 1999
INVENTOR(S) : Takashi Hirasa, et al.

It is certified that error appears in the above-identified patent and that said Letters Patent is hereby corrected as shown below:

Column 15, Line 66, "$R_1$" should read --$R_4$--.

Signed and Sealed this

Seventeenth Day of August, 1999

Attest:

Q. TODD DICKINSON

*Attesting Officer*     *Acting Commissioner of Patents and Trademarks*